(12) United States Patent
Kaneko et al.

(10) Patent No.: US 9,004,222 B2
(45) Date of Patent: Apr. 14, 2015

(54) ELECTRIC POWER STEERING APPARATUS

(71) Applicant: Jtekt Corporation, Osaka-shi, Osaka (JP)

(72) Inventors: Tetsuya Kaneko, Okazaki (JP); Toshihiro Asakura, Chiryu (JP); Yuichi Yamanaka, Toyonaka (JP)

(73) Assignee: Jtekt Corporation, Osaka (JP)

( * ) Notice: Subject to any disclaimer, the term of this patent is extended or adjusted under 35 U.S.C. 154(b) by 0 days.

(21) Appl. No.: 13/867,586

(22) Filed: Apr. 22, 2013

(65) Prior Publication Data
US 2014/0027196 A1 Jan. 30, 2014

(30) Foreign Application Priority Data

Jul. 24, 2012 (JP) ................. 2012-163751

(51) Int. Cl.
B62D 5/04 (2006.01)
F16C 35/063 (2006.01)

(52) U.S. Cl.
CPC ............. B62D 5/0448 (2013.01); F16C 35/063 (2013.01)

(58) Field of Classification Search
CPC ...... B62D 5/04; B62D 5/0448; B62D 5/0445; B62D 5/0442
USPC ......................... 180/443, 444, 446
See application file for complete search history.

(56) References Cited

U.S. PATENT DOCUMENTS

| 7,191,866 | B2 * | 3/2007 | Sasaki et al. | 180/444 |
| 7,278,334 | B2 * | 10/2007 | Saruwatari et al. | 74/388 PS |
| 7,360,624 | B2 * | 4/2008 | Nagamatsu | 180/444 |
| 2003/0221896 | A1 * | 12/2003 | Sasaki et al. | 180/444 |
| 2006/0060413 | A1 * | 3/2006 | Namgung | 180/444 |
| 2006/0219470 | A1 * | 10/2006 | Imagawa et al. | 180/446 |
| 2007/0102229 | A1 * | 5/2007 | Murakami et al. | 180/444 |
| 2007/0114093 | A1 * | 5/2007 | Osuka et al. | 180/444 |
| 2012/0018242 | A1 | 1/2012 | Yamamoto | |
| 2013/0112493 | A1 * | 5/2013 | Kim | 180/444 |

FOREIGN PATENT DOCUMENTS

JP    A-2012-25246    2/2012

* cited by examiner

Primary Examiner — Joseph Rocca
Assistant Examiner — Marlon Arce
(74) Attorney, Agent, or Firm — Oliff PLC

(57) ABSTRACT

An electric power steering apparatus transmits rotational force of a motor to a rack shaft via a driver pulley, a belt, a driven pulley, and a ball nut. A ball bearing and the driven pulley are fitted to the outer circumferential surface of the ball nut. Also, the ball nut is rotationally supported to the inner circumferential surface of a housing via the ball bearing. A female thread portion is formed on the inner circumferential surface of the driven pulley. The ball nut has a male thread portion formed in a first end and a flange formed in a second end. By fastening the male thread portion and the female thread portion to each other, the ball bearing is clamped between the flange and the driven pulley, while the ball nut and the driven pulley are fastened to each other.

3 Claims, 5 Drawing Sheets

ELECTRIC POWER STEERING APPARATUS

CROSS-REFERENCE TO RELATED APPLICATIONS

This application is based upon and claims the benefit of priority from prior Japanese Patent Application No. 2012-163751, filed on Jul. 24, 2012, the entire contents of which are incorporated herein by reference.

BACKGROUND OF THE INVENTION

The present invention relates to an electric power steering apparatus.

Conventionally, electric power steering apparatuses (hereinafter, referred to as EPS) have been known that apply force of a motor to the steering system of a vehicle to assist steering operation of the driver. For example, Japanese Laid-Open Patent Publication No. 2012-25246 discloses an EPS that includes a rack-and-pinion mechanism as a steering system. The rack-and-pinion mechanism includes a pinion, which rotates according to a steering operation, and a rack shaft, which meshes with the pinion. The rack-and-pinion mechanism converts rotation of the pinion to linear motion of the rack shaft, thereby changing the direction of wheels. The rack shaft includes a ball screw mechanism, which converts rotation of a motor to linear motion of the rack shaft. That is, the rotational force of the motor is used to assist the motion of the rack shaft, which in turn assists steering operations.

Specifically, as shown in FIG. 6, an EPS 100 transmits rotational force of a motor 101 to a rack shaft 106 via a cylindrical driver pulley 102, a timing belt 103, a cylindrical driven pulley 104, and ball screw mechanism 105. The ends of the rack shaft 106 are each coupled to a wheel via a ball joint.

The ball screw mechanism 105 includes a ball screw portion 105a, which is formed in part of the rack shaft 106, and a ball nut 107, which meshes with the ball screw portion 105a via balls. The ball nut 107 has a flange 107a, which is formed on the outer circumferential surface at a first end 107d, and a male thread 107b, which is formed on the outer circumferential surface at a second end 107e. A lock nut 108 is fastened to the male thread 107b.

The driven pulley 104 and a ball bearing 109 are arranged along the outer circumferential surface of the ball nut 107 and between the flange 107a and the lock nut 108. The driven pulley 104 is arranged to contact the flange 107a, and the ball bearing 109 is arranged to contact the lock nut 108. The driven pulley 104 and the ball bearing 109 (the inner race of the ball bearing 109, to be precise) are brought into an area contact with each other at a position between the driven pulley 104 and the ball bearing 109 with respect to the axial direction of the ball nut 107.

The driven pulley 104 has an annular step 104a, which is located on the inner circumferential surface at an end separated away from the ball bearing 109. The step 104a is formed at the end of the driven pulley 104 that is separated away from the ball bearing 109 by increasing the inner diameter of the driven pulley 104 without increasing the outer diameter thereof. The step 104a contacts the flange 107a in the axial direction of the ball nut 107.

The driven pulley 104 and the ball bearing 109 (the inner race) are clamped between the flange 107a of the ball nut 107 and the lock nut 108, which is fastened to the male thread 107b. Accordingly, the driven pulley 104 and the ball bearing 109 are restricted from moving in the axial direction relative to the ball nut 107. The driven pulley 104 and the ball bearing 109 are fixed to the ball nut 107 so that the ball nut 107 rotates integrally with the driven pulley 104.

In recent years, the energy saving aspect of EPS has been receiving attention, and more and more models of cars have been equipped with an EPS like that disclosed in Japanese Laid-Open Patent Publication No. 2012-25246. On the other hand, demands for reduction in the weight and costs of EPS have become more and more intense. To meet such demands, an EPS having a reduced number of components and a simple structure has been desired.

SUMMARY OF THE INVENTION

Accordingly, it is an objective of the present invention to provide an electric power steering apparatus having a simplified structure.

To achieve the foregoing objective, and in accordance with one aspect of the present invention, an electric power steering apparatus that uses rotational force of a motor to assist motion of a rack shaft, which moves linearly in accordance with a steering operation is provided. The electric power steering apparatus includes a power conversion mechanism and a housing that accommodates the rack shaft and the power conversion mechanism. The power conversion mechanism converts rotation of the motor to linear motion of the rack shaft. The power conversion mechanism includes a ball screw mechanism and a transmission mechanism. The ball screw mechanism includes a ball nut that is threaded to the rack shaft via a plurality of balls and is rotationally supported on an inner circumferential surface of the housing via a bearing. The transmission mechanism includes a driving wheel that rotates as a drive of the motor, and a driven wheel that is fitted about an outer circumferential surface of the ball nut to transmit rotation of the driving wheel to the ball nut. The ball nut includes a first end that is inserted in and directly coupled to the driven wheel, and a second end, where a flange is formed. An inner race of the bearing is clamped between the driven wheel and the flange in an axial direction of the ball nut.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An electric power steering apparatus 10 of a rack-parallel type according to a first embodiment of the present invention will now be described with reference to FIGS. 1 and 2. The rack-parallel type refers to an electric power steering apparatus in which the axial direction of a steering assist motor is parallel to the rack shaft.

Figure 1:
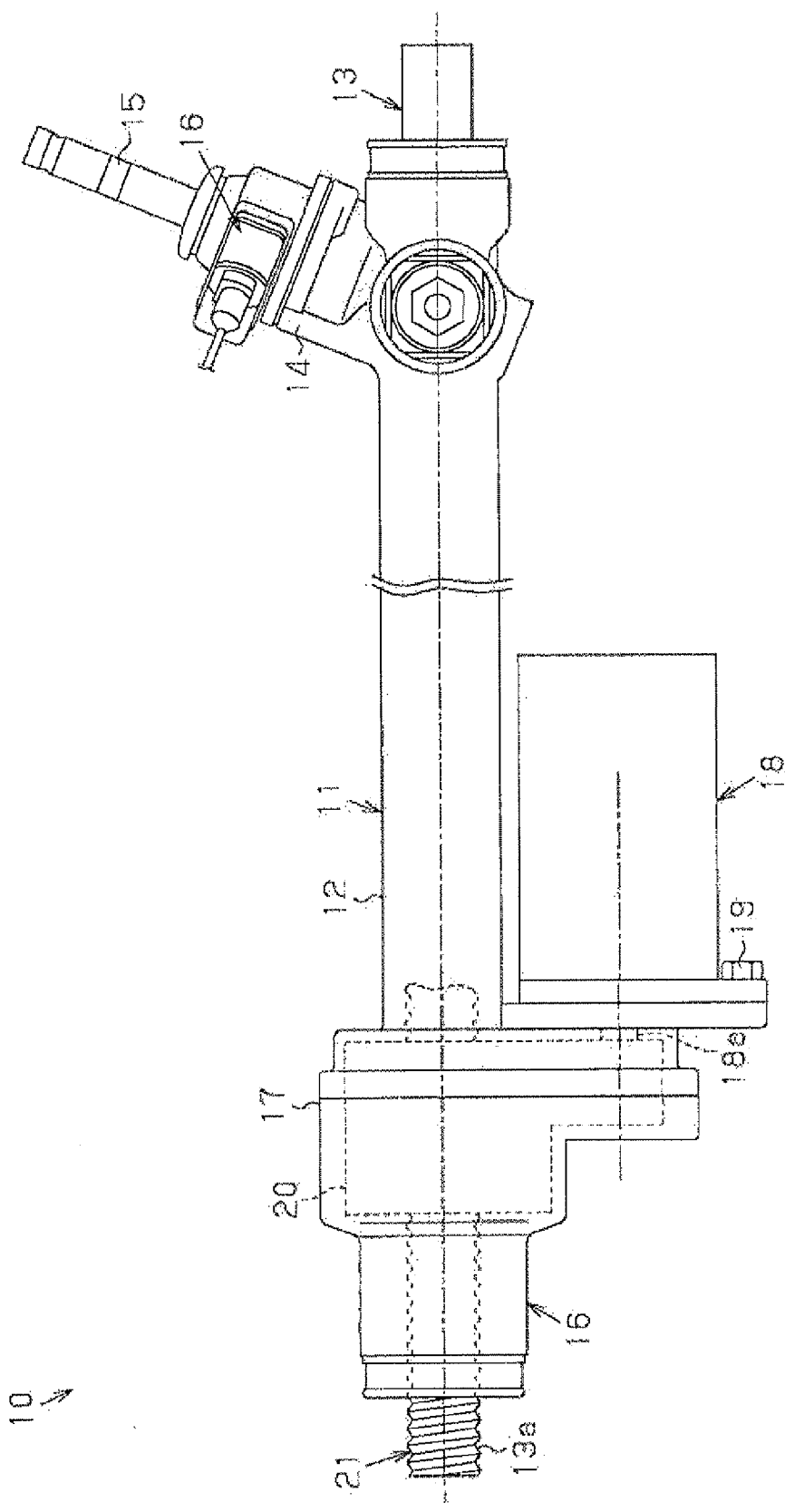
FIG. 1 is a front view showing an electric power steering apparatus according to a first embodiment.

As shown in FIG. 1, the electric power steering apparatus 10 includes a housing 11, which is fixed to a vehicle body (not shown). The housing 11 includes a cylindrical main body 12, which extends in the left-right direction of the vehicle. A rack shaft 13 is received in the main body 12. The ends of the rack shaft 13 are each coupled to a wheel (not shown) via a ball joint (not shown). As the rack shaft 13 moves in its axial direction, the direction of the wheels is changed.

First Accommodating Portion

As shown in FIG. 1, a first accommodating portion 14 is formed at part of the main body 12 near the right end. The first accommodating portion 14 extends in a direction obliquely in relation to the axial direction of the main body 12 (the left-right direction in FIG. 1). A pinion shaft 15, which is rotationally supported, is inserted in the first accommodating portion 14. The pinion shaft 15 has pinion teeth formed at the inner end (not shown) close to the rack shaft 13. The pinion teeth mesh with rack teeth (not shown), which are formed in a predetermined range near the right end of the rack shaft 13. An outer end (not shown) of the pinion shaft 15, which is separated away from the rack shaft 13, is coupled to the steering wheel via non-illustrated several shafts. Therefore, manipulation of the steering wheel causes the rack shaft 13 to move linearly in the axial direction. The torque applied to the pinion shaft 15 when the steering wheel is operated is detected by a torque sensor 16 attached to the first accommodating portion 14.

Second Accommodating Portion

As shown in FIG. 1, a second accommodating portion 17 is formed at part of the main body 12 near the left end. The second accommodating portion 17 includes a cylindrical portion having a diameter greater than that of the main body 12, and the lower part of the cylindrical portion extends downward. A motor 18 is fixed by a bolt 19 to the right side wall of the lower portion of the second accommodating portion 17. The motor 18 has an output shaft 18a, which extends parallel with the axial direction of the rack shaft 13. The output shaft 18a extends through the right side wall of the second accommodating portion 17 into the second accommodating portion 17. The second accommodating portion 17 houses a power conversion mechanism 20. The output shaft 18a of the motor 18 is coupled to the power conversion mechanism 20. The power conversion mechanism 20 converts rotation of the output shaft 18a of the motor 18 into linear motion of the rack shaft 13. That is, the rotational force of the motor 18 is used to assist the motion of the rack shaft 13, which in turn assists steering operations. The motor 18 is controlled by a controller (not shown) in accordance with information such as detection results of the torque sensor 16.

Figure 2:
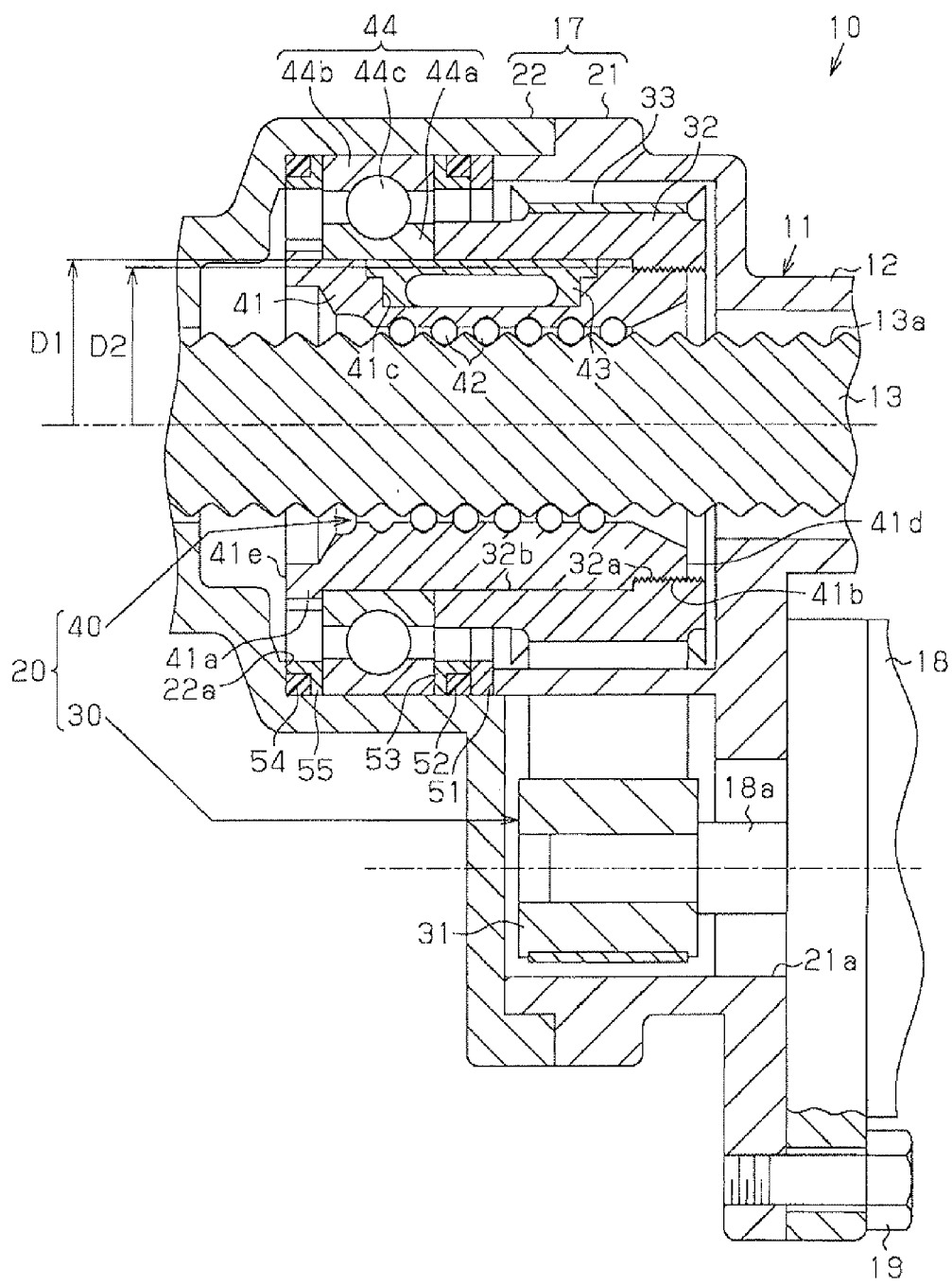
FIG. 2 is an enlarged cross-sectional view showing the electric power steering apparatus according to the first embodiment.

As shown in FIG. 2, the second accommodating portion 17 has a cylindrical support portion 21 and a stepped cylindrical lid member 22. The lid member 22 has a large diameter portion and a small diameter portion. The support portion 21 is formed integrally with the left end of the main body 12. The lower part of the support portion 21 extends downward and has a hole 21a in the right side wall. The output shaft 18a of the motor 18 is inserted from right into the hole 21a. The left opening of the support portion 21 is closed by the lid member 22. That is, the peripheral edge of the left opening of the support portion 21 is received in the large diameter portion of the lid member 22. In this state, the lid member 22 is fixed to the support portion 21 by a bolt (not shown). The power conversion mechanism 20 is located in a space formed between the support portion 21 and the lid member 22.

Power Conversion Mechanism

As shown in FIG. 2, the power conversion mechanism 20 includes a belt transmission mechanism 30 and a ball screw mechanism 40. The belt transmission mechanism 30 transmits rotation of the motor 18 to the ball screw mechanism 40. The ball screw mechanism 40 converts rotation of the motor 18, which is transmitted via the belt transmission mechanism 30, into a linear motion of the rack shaft 13.

Ball Screw Mechanism

The ball screw mechanism 40 includes a ball screw portion 13a, which is formed in the rack shaft 13, a ball nut 41, balls 42, and a recirculating member (deflector) 43.

The ball screw portion 13a has a ball screw groove formed on the outer circumferential surface of the rack shaft 13. The ball screw portion 13a is formed from the left end of the rack shaft 13 toward the right end over a predetermined range. The ball nut 41 is threaded to the ball screw portion 13a of the rack shaft 13 via the balls 42 to move back and forth to the rack shaft 13. The ball nut 41 has a flange 41a, which is formed on the outer circumferential surface at a second end 41e (the left end as viewed in FIG. 2), and a male thread portion 41b, which is formed on the outer circumferential surface at a first end 41d (the right end as viewed in FIG. 2). A recess 41c is formed in the outer circumferential surface of the ball nut 41, and the recirculating member 43 is fitted in the recess 41c to recirculate the plurality of balls. The outer surface of the recirculating member 43 forms part of the outer circumferential surface of the ball nut 41. As the ball nut 41 rotates, each ball 42 rolls between the ball nut 41 and the ball screw portion 13a. The recirculating member 43 is inserted in the ball nut 41 and guides each ball 42 in a lead of the ball screw groove so that the ball 42 is circulated endlessly.

A ball bearing 44 is fixed to the outer circumferential surface of the ball nut 41. The ball nut 41 is rotationally supported by the inner circumferential surface of the lid member 22 of the housing 11 via the ball bearing 44.

Belt Transmission Mechanism

The belt transmission mechanism 30 includes a cylindrical driver pulley 31, which serves as a driving wheel, a cylindrical driven pulley 32, which serves as a driven wheel, and an endless belt 33.

The driver pulley 31 is fixed to the output shaft 18a of the motor 18. Thus, the driver pulley 31 rotates integrally with the output shaft 18a.

Like the ball bearing 44, the driven pulley 32 is fixed to the outer circumferential surface of the ball nut 41. Specifically, a female thread portion 32a and a large diameter portion 32b are formed on the inner circumferential surface of the driven pulley 32. The female thread portion 32a and the large diameter portion 32b are adjacent to each other in the axial direction of the ball nut 41. The female thread portion 32a is formed from the right end of the driven pulley 32 toward the left end over a predetermined range. The large diameter portion 32b extends from the left end of the female thread portion 32a to the left end of the driven pulley 32. The inner diameter D1 of the large diameter portion 32b is set to be slightly larger than the groove diameter D2 of the female thread portion 32a. The inner diameter D1 of the large diameter portion 32b is substantially equal to the outer diameter of part of the ball nut 41 between the flange 41a and the male thread portion 41b and slightly smaller than the outer diameter of the flange 41a. The male thread portion 41b of the ball nut 41 is inserted into the driven pulley 32 via the large diameter portion 32b and is fastened to the female thread portion 32a, so that the driven pulley 32 and the ball nut 41 are coupled to each other. Therefore, the driven pulley 32 rotates integrally with the ball nut 41.

The belt 33 is looped over the outer circumferential surface of the driver pulley 31 and the outer circumferential surface of the driven pulley 32. Rotation of the motor 18 is therefore transmitted to the ball nut 41 via the driver pulley 31, the belt 33, and the driven pulley 32.

Ball Bearing Fixing Structure

A fixing structure for fixing the ball bearing 44 to the outer circumferential surface of the ball nut 41 will now be described. As shown in FIG. 2, the ball bearing 44 includes an inner race 44a, an outer race 44b, and balls 44c, which are arranged between the races 44a, 44b.

The inner race 44a of the ball bearing 44 is fitted to the outer circumferential surface of the ball nut 41. The inner race 44a is also clamped between the flange 41a and the driven pulley 32 in the axial direction of the ball nut 41. That is, as described above, the male thread portion 41b of the ball nut 41 is fastened to the female thread portion 32a of the driven pulley 32, so that the inner race 44a of the ball bearing 44 is pressed against the left end face of the driven pulley 32 (against the side face away from the female thread portion 32a) by the flange 41a of the ball nut 41. Since the inner race 44a of the ball bearing 44 remains clamped between the flange 41a and the driven pulley 32, the position of the inner race 44a of the ball bearing 44 is fixed relative to the ball nut 41 in the axial direction.

The outer race 44b of the ball bearing 44 is fitted to the inner circumferential surface of the lid member 22. A support ring 51, an annular plate-shaped gasket 52, and a gasket cover 53 are located between the outer race 44b and the peripheral edge of the left opening of the support portion 21. The support ring 51 is held in a state contacting the peripheral edge of the left opening of the support portion 21. The gasket cover 53 is a ring having an L-shaped cross section. The support ring 51, the gasket cover 53, and the inner circumferential surface of the lid member 22 define an annular space, in which the gasket 52 is accommodated. The gasket 52 is held in a state compressed in the axial direction of the ball nut 41. An annular step 22a is formed on the bottom surface of the lid member 22. An annular plate-shaped gasket 54 and a gasket cover 55 are located between the outer race 44b and the step 22a. The gasket cover 55 is a ring having an L-shaped cross section. The inner surface of the lid member 22 including the step 22a and the gasket cover 55 define an annular space, in which the gasket 54 is accommodated. The gasket 54 is held in a state compressed in the axial direction of the ball nut 41. The outer race 44b of the ball bearing 44 is clamped between the support portion 21 and the lid member 22 via the support ring 51, the gasket 52 and the gasket cover 53, and the gasket 54 and the gasket cover 55. This fixes the position of the outer race 44b of the ball bearing 44 in the axial direction with respect to the lid member 22.

As the ball nut 41 rotates, the balls 44c roll between the inner race 44a and the outer race 44b.

Operation of Ball Bearing Fixing Structure

Next, operation of the structure for fixing the ball bearing 44, as well as a method for coupling the driven pulley 32 and the ball nut 41 to each other, will be described.

When the driven pulley 32 and the ball nut 41 are coupled to each other, the ball nut 41 is inserted into the ball bearing 44 and the driven pulley 32 from left so that the male thread portion 41b approaches the female thread portion 32a. Since the inner diameter D1 of the large diameter portion 32b is larger than the outer diameter of the male thread portion 41b as described above, the male thread portion 41b is prevented from contacting the inner circumferential surface of the driven pulley 32 at the initial stage of the insertion. Also, after the male thread portion 41b is entirely inserted in the large diameter portion 32b, part of the ball nut 41 between the flange 41a and the male thread portion 41b is guided to the inner circumferential surface of the large diameter portion 32b. Therefore, the male thread portion 41b is smoothly inserted without contacting the inner circumferential surface of the driven pulley 32. Thereafter, the male thread portion 41b is fastened to the female thread portion 32a, so that the ball nut 41 is fixed to the inner circumferential surface of the driven pulley 32. The tightening force applied to the female thread portion 32a by the male thread portion 41b is set to be sufficiently great to prevent the ball nut 41 from being loosened from the driven pulley 32 when the driven pulley 32 rotates.

Further, as the male thread portion 41b is fastened to the female thread portion 32a, the ball nut 41 is moved rightward relative to the driven pulley 32. At this time, the flange 41a of the ball nut 41 is also moved rightward. As described above, the outer diameter of the flange 41a is larger than the inner diameter D1 of the large diameter portion 32b, and the flange 41a contacts the inner race 44a attached to the outer circumference of the ball nut 41 when moving rightward. In this state, the male thread portion 41b is further fastened to the female thread portion 32a by an adequate amount, so that the inner race 44a of the ball bearing 44 is pressed against the driven pulley 32 by the flange 41a. That is, the ball bearing 44 is fixed by being clamped between the flange 41a of the ball nut 41 and the driven pulley 32. Accordingly, the structure of the present embodiment is simplified compared to the conventional structure shown in FIG. 6. Specifically, in the structure shown in FIG. 6, the driven pulley 104 and the ball bearing 109 are clamped between the flange 107a of the ball nut 107 and the lock nut 108 fastened to the male thread 107b. The present embodiment has a simpler structure since it does not require the lock nut 108. The force by which the ball bearing 44 is clamped can be freely adjusted by changing the force by which the male thread portion 41b is fastened to the female thread portion 32a.

In recent years, the size of the housing 11 is still desired to be reduced from the standpoint of improvement in the mounting characteristics to a vehicle body. For example, the protruding amount of the second accommodating portion 17 from the circumferential surface of the main body 12 of the housing 11 is desired to be reduced.

Figure 6:
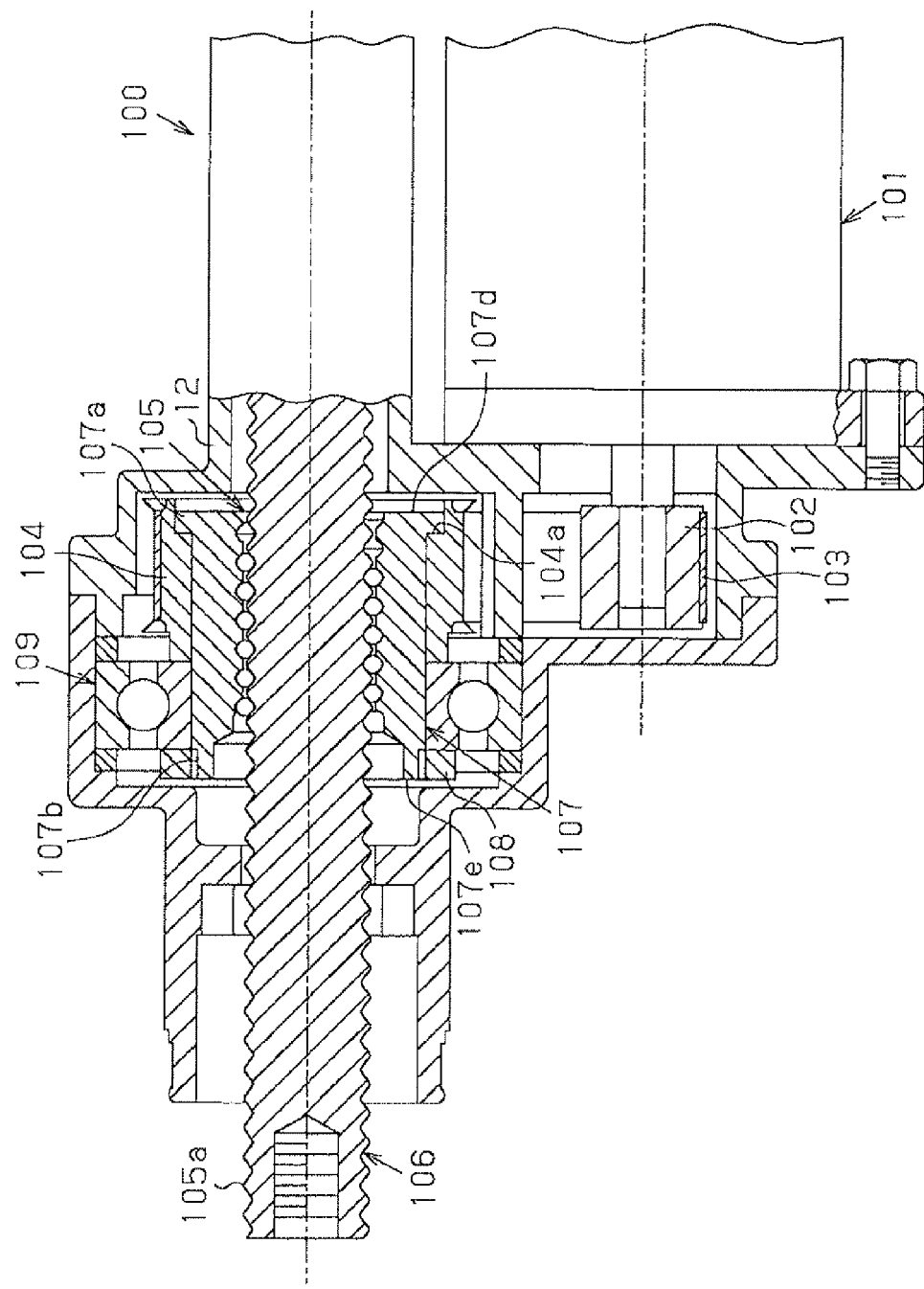
FIG. 6 is an enlarged cross-sectional view showing a conventional electric power steering apparatus.

In this regard, the conventional EPS 100 shown in FIG. 6 needs to have the flange 107a, which is formed at the first end 107d of the ball nut 107, and the step 104a, which is formed on the inner circumferential surface of the driven pulley 104 to contacts the flange 107a in the axial direction. To reliably hold the ball bearing 109 and the driven pulley 104 with the lock nut 108 and the flange 107a, a sufficient contact area needs to be provided between the step 104a and the flange 107a. Thus, in the conventional EPS 100, reduction in the diameter of the step 104a has limitation. Accordingly, reduction in the thickness in the radial direction of the driven pulley 104 has limitation.

In contrast, according to the first embodiment, since the male thread portion 41b of the ball nut 41 is threaded to the inner circumferential surface of the driven pulley 32, the step 104a of the conventional structure need not be formed in the driven pulley 32. Therefore, the thickness of the driven pulley 32 in the radial direction need not be determined by taking into consideration the depth of the step 104a. The thickness of the driven pulley 32 can be reduced, which allows reduction in the outer diameter of the driven pulley 32. As the diameter of the driven pulley 32 is reduced, a ball bearing 44 having a smaller outer diameter can be employed. Also, it is possible to reduce the size of the second accommodating portion 17, which accommodates the ball screw mechanism 40.

Advantages of First Embodiment

Accordingly, the first embodiment has the following advantages.

(1) The female thread portion 32a is formed on the inner circumferential surface of the driven pulley 32. Also, the flange 41a is formed at the second end 41e of the ball nut 41, and the male thread portion 41b is formed at the first end 41d. By fastening the male thread portion 41b to the female thread portion 32a, the ball bearing 44 is clamped by the flange 41a of the ball nut 41 and the driven pulley 32, while the ball nut 41 and the driven pulley 32 are fastened. Accordingly, the structure of the present embodiment is simplified compared to the structure shown in FIG. 6. Specifically, in the structure shown in FIG. 6, the driven pulley 104 and the ball bearing 109 are clamped between the flange 107a of the ball nut 107 and the lock nut 108 fastened to the male thread 107b. The present embodiment has a simpler structure since it does not require the lock nut 108. This reduces the number of components and thus the manufacturing costs.

(2) As the male thread portion 41b is fastened to the female thread portion 32a, the flange 41a of the ball nut 41 approaches the driven pulley 32. Utilizing this configuration, the inner race 44a of the ball bearing 44 can be easily clamped by the flange 41a and the driven pulley 32.

(3) Since the male thread portion 41b of the ball nut 41 is threaded to the inner circumferential surface of the driven pulley 32, the step 104a shown in FIG. 6 need not be formed in the driven pulley 32. The thickness of the driven pulley 32 in the radial direction need not be determined by taking into consideration the depth of the step 104a. The thickness of the driven pulley 32 can be reduced, which allows reduction in the diameter of the driven pulley 32. As the diameter of the driven pulley 32 is reduced, a ball bearing 44 having a smaller outer diameter can be employed. The diameter of the second accommodating portion 17 can be reduced by reducing the outer diameters of the driven pulley 32 and the ball bearing 44.

(4) Unlike the structure of FIG. 6, the step 104a need not be formed in the driven pulley 32. The driven pulley 32 therefore has a constant thickness over the entire length in the axial direction. Therefore, the strength of the driven pulley 32 is ensured.

(5) The large diameter portion 32b, which has a slightly larger diameter than the groove diameter of the female thread portion 32a, is formed on the inner circumferential surface of the driven pulley 32. Therefore, when the ball nut 41 is inserted into the driven pulley 32, the threads of the male thread portion 41b of the ball nut 41 are prevented from contacting the inner circumference of the driven pulley 32.

(6) The male thread portion 41b of the ball nut 41 is formed at a part offset in the axial direction of the ball nut 41 from the recirculating member 43. Specifically, the male thread portion 41b is formed in the first end 41d, which is a part of the ball nut 41 that is separated from the flange 41a. Therefore, when the male thread portion 41b is fastened to the female thread portion 32a, the fastening force does not act on the recirculating member 43. Thus, the recirculating member 43 is prevented from being deformed due to fastening of the male thread portion 41b to the female thread portion 32a. The male thread portion 41b may be extended to the recirculating member 43 (specifically, to the recess 41c of the ball nut 41).

Second Embodiment

An electric power steering apparatus 61 of a rack-cross type according to a second embodiment of the present invention will now be described. The rack-cross type refers to an electric power steering apparatus in which the axial direction of a steering assist motor intersects the rack shaft. The same reference numerals are given to those components that are like or the same as the corresponding components of the first embodiment and detailed explanations are omitted.

Figure 3:
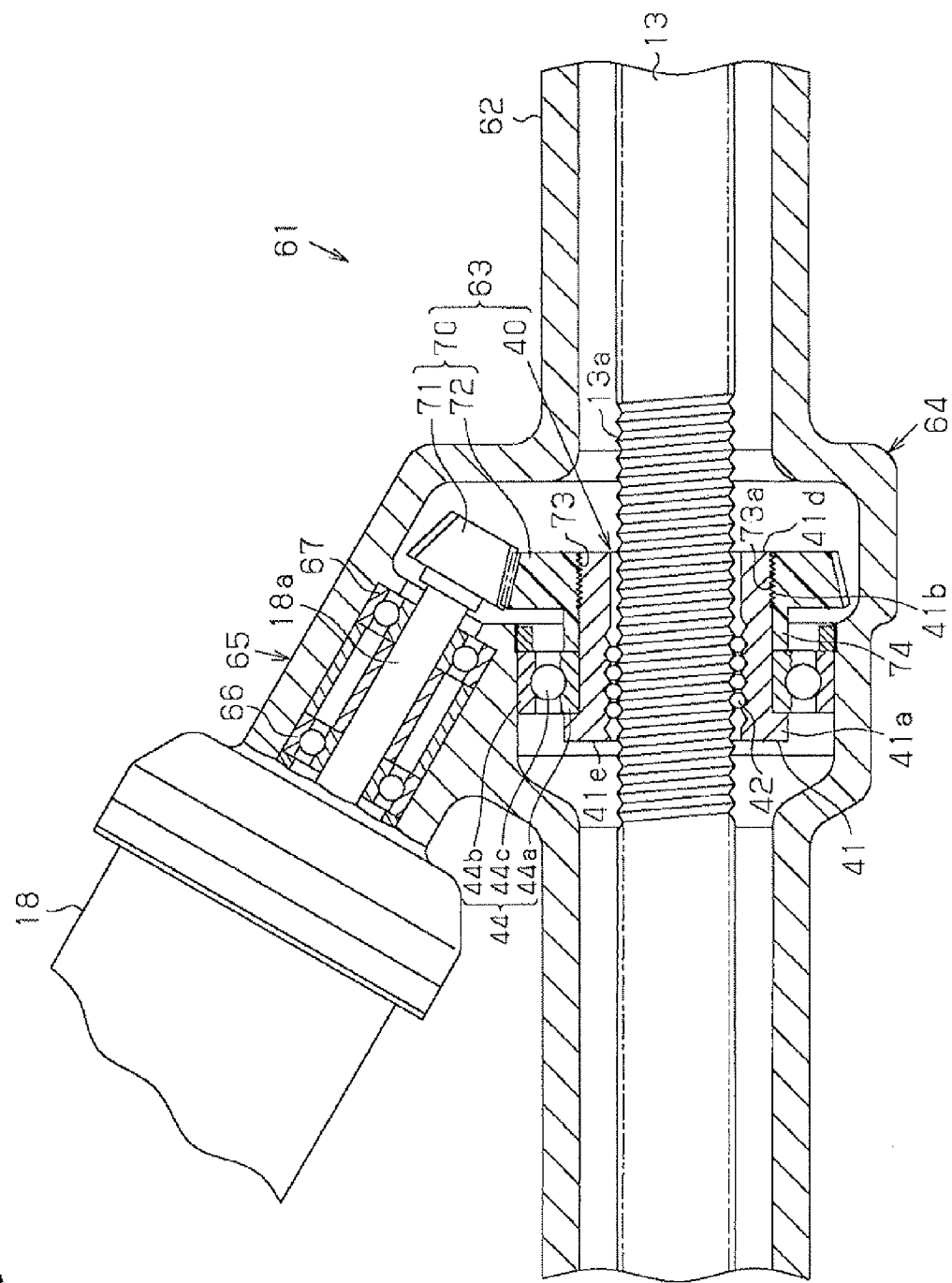
FIG. 3 is an enlarged cross-sectional view showing an electric power steering apparatus according to a second embodiment.

As shown in FIG. 3, the electric power steering apparatus 61 according to the second embodiment includes a housing 62, which receives the rack shaft 13. The housing 62 has an accommodating portion 64 for accommodating a power conversion mechanism 63 and an attaching portion 65, to which the motor 18 is attached. The power conversion mechanism 63 converts rotation of the motor 18 into linear motion of the rack shaft 13. The attaching portion 65 is cylindrical and is formed in the upper part of the accommodating portion 64. The attaching portion 65 extends in a direction that intersects the axial direction of the rack shaft 13. The interior of the accommodating portion 64 and the interior of the attaching portion 65 communicate with each other.

The motor 18 is fixed to the attaching portion 65 and the output shaft 18a of the motor 18 is inserted in the interior of the attaching portion 65. The output shaft 18a is rotationally supported by the inner circumferential surface of the attaching portion 65 via two bearings 66, 67. The output shaft 18a extends in a direction intersecting the axial direction of the rack shaft 13. The distal end of the output shaft 16a extends into the accommodating portion 64.

The power conversion mechanism 63 includes a ball screw mechanism 40 and a gear transmission mechanism 70.

The ball screw mechanism 40 of the second embodiment has the same configuration as that of the first embodiment. That is, the ball nut 41 is threaded to the ball screw portion 13a of the rack shaft 13 via the balls 42. Also, the ball nut 41 is rotationally supported by the inner circumferential surface of the housing 62 via the ball bearing 44. Further, a flange 41a is formed at a second end 41e (the left end) of the ball nut 41, and an male thread portion 41b is formed at a first end 41d (the right end).

The gear transmission mechanism 70 includes a drive gear 71, which serves as a driving wheel, a driven gear 72, which serves as a driven wheel. The drive gear 71 and the driven gear 72 are both bevel gears. The drive gear 71 is fixed to the distal end of the output shaft 18a. The driven gear 72 is fixed to the first end 41d, which is separated away from the flange 41a of the ball nut 41. The drive gear 71 and the driven gear 72 mesh with each other. Rotation force of the motor 18 is therefore transmitted to the ball nut 41 via the drive gear 71 and the driven gear 72.

The driven gear 72 has a through hole 73, which extends in the axial direction of the rack shaft 13. An female thread portion 73a is formed on the inner circumferential surface of the hole 73. The driven gear 72 has a cylindrical contact portion 74, which is formed on a side surface that faces the ball bearing 44 and extends along the opening periphery of the hole 73. The inner diameter of the contact portion 74 is set to be approximately the same as the outer diameter of the ball nut 41.

The ball nut 41 is inserted into the driven gear 72 via the contact portion 74 of the driven gear 72, and the male thread portion 41b of the ball nut 41 is fastened to the female thread portion 73a of the driven gear 72. The male thread portion 41b is fastened to the female thread portion 73a, so that the ball nut 41 is fixed to the hole 73 of the driven gear 72. Therefore, the driven gear 72 rotates integrally with the ball nut 41.

As in the case of the first embodiment, the inner race 44a of the ball bearing 44 is fitted to the outer circumferential surface of the ball nut 41. The inner race 44a is also clamped between the flange 41a and the driven gear 72 (the contact portion 78, to be precise) in the axial direction of the ball nut 41. That is, the male thread portion 41b of the ball nut 41 is fastened to the female thread portion 73a of the driven gear 72, so that the inner race 44a of the ball bearing 44 is pressed against the distal end face of the contact portion 74 of the driven gear 72. Since the inner race 44a of the ball bearing 44 is held in an area contact with the distal end face of the contact portion 74, the position of the ball bearing 44 is fixed relative to the ball nut 41.

Accordingly, the second embodiment has the following advantage.

(7) The female thread portion 73a is formed on the inner circumferential surface of the driven gear 72. Also, the flange 41a is formed at the second end 41e of the ball nut 41, and the male thread portion 41b is formed at the first end 41d. By fastening the male thread portion 41b to the female thread portion 73a, the ball bearing 44 is clamped by the flange 41a of the ball nut 41 and the contact portion 74 of the driven gear 72, while the ball nut 41 and the driven gear 72 are fastened.

As in the case of the conventional EPS 100 shown in FIG. 6, a lock nut 108 may be fastened to the first end 41d, which is separated away from the flange 41a of the ball nut 41 in a rack-cross type electric power steering apparatus, so that the ball bearing 44 and the driven gear 72 are clamped between the lock nut 108 and the flange 41a. Compared to such a structure, the structure of the second embodiment is more simple since it does not require the lock nut 108. This reduces the number of components and thus the manufacturing costs.

Other Embodiments

The first and second embodiments may be modified as follows.

The belt transmission mechanism 30 of the first embodiment may be replaced by a chain transmission mechanism. In this case, the driver pulley 31, the driven pulley 32, and the belt 33 are respectively replaced by a drive sprocket, an idler sprocket, and a roller chain. The male thread portion 41b of the ball nut 41 is threaded to the idler sprocket, so that the ball bearing 44 is clamped between the flange 41a and the idler sprocket.

Alternatively, the belt transmission mechanism 30 of the first embodiment may be replaced by a gear mechanism. In this case, the driver pulley 31 and the driven pulley 32 are respectively replaced by a drive spur gear and a driven spur gear, which are meshed with each other. The male thread portion 41b of the ball nut 41 is threaded to the driven spur gear, so that the ball bearing 44 is clamped between the flange 41a and the driven spur gear.

In the first and second embodiments, the ball nut 41 is rotationally supported by the inner circumferential surface of the housing via the ball bearing 44, which is a type of rolling-element bearing. The ball bearing 44 may be replaced by another type of rolling-element bearing, such as a roller bearing.

In the first embodiment, the driven pulley 32 and the ball nut 41 are coupled to each other by fastening the male thread portion 41b of the ball nut 41 to the female thread portion 32a of the driven pulley 32. In the second embodiment, the driven gear 72 and the ball nut 41 are coupled to each other by fastening the male thread portion 41b of the ball nut 41 to the female thread portion 73a of the driven gear 72. In place of such fastening with threads, adhesion, pressing-fitting, and spline-engagement (fitting) may be employed as means for coupling the driven pulley 32 or the driven gear 72 to the ball nut 41. That is, any fastening means may be employed as long as the ball bearing 44 is clamped between the flange 41a and the driven pulley 32 or between the flange 41a and the driven gear 72. In a case in which the driven pulley 32 or the driven gear 72 is coupled to the ball nut 41 by means of adhesion or press-fitting, the male thread portion 41b and the female thread portion 32a, 73a do not need to be formed. When spline-engagement is employed as the coupling means, relative rotation between the ball nut 41 and the driven pulley 32 is reliably prevented.

Loosening prevention means may be added to the fastening structure of the driven pulley 32 or the driven gear 72 with the ball nut 41 in the first and second embodiments. For example, as the loosening prevention means, a structure may be employed that restricts movement of the ball nut 41 in the axial direction when the ball nut 41 is rotated in a direction loosening the engagement of the driven pulley 32 or the driven gear 72.

Figure 4:
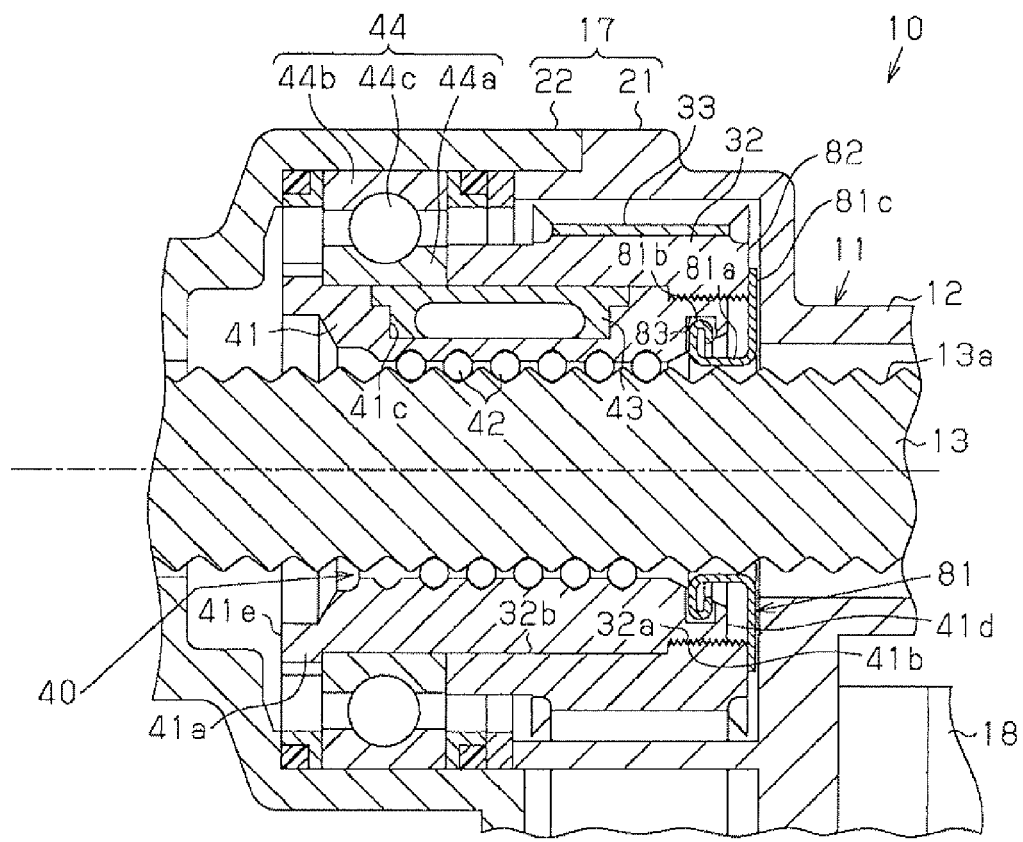
FIG. 4 is an enlarged cross-sectional view showing an electric power steering apparatus according to another embodiment.
Figure 5A:
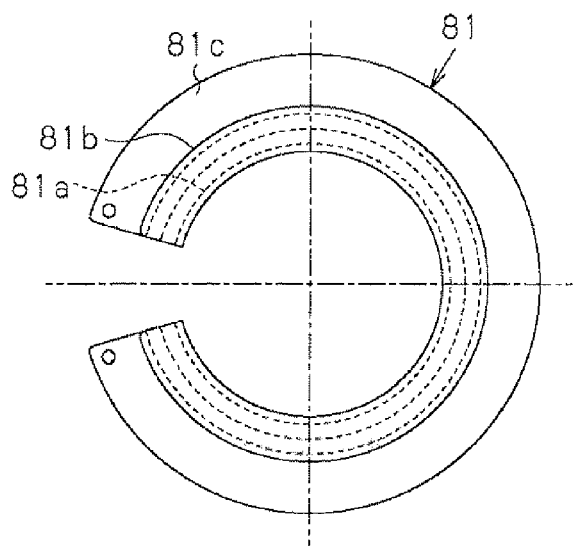
FIG. 5A is a front view of a loosening prevention member of the embodiment shown in FIG. 4.
Figure 5B:
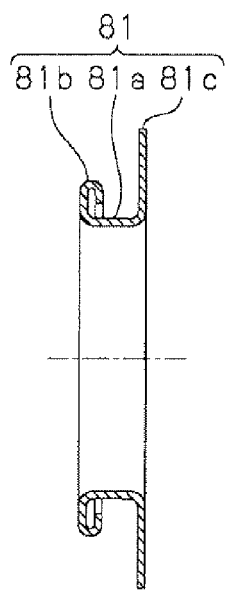
FIG. 5B is a cross-sectional view taken along center line in FIG. 4, showing the loosening prevention member.

A case will be described in which the loosening prevention means is employed in the first embodiment. In this case, a cylindrical loosening prevention member 81 is provided as the loosening prevention means as shown in FIG. 4. The loosening prevention member 81 engages with the driven pulley 32 and the ball nut 41 while being fitted about the rack shaft 13. As shown in FIG. 5A, the loosening prevention member 81 is substantially C-shaped when viewed in the axial direction. As shown in FIG. 5B, the loosening prevention member 81 has a C-shaped cylindrical body 81a, which is fitted about the rack shaft 13, an engaging portion 81b, which is formed at a first end of the body 81a, and a contact portion 81c, which is formed at a second end of the body 81a. The engaging portion 81b extends in the radial direction of the body 81a and has a flange-like shape. The outer periphery of the engaging portion 81b is folded back to the side facing the second end of the body 81a. The contact portion 81c is a flange-like C-shaped plate extending in the radial direction of the body 81a. The outer diameter of the contact portion 81c is larger than that of the engaging portion 81b. As shown in FIG. 4, the contact portion 81c is engaged with a right end face 82 of the driven pulley 32 in the axial direction of the loosening prevention member 81. An annular groove 83 is formed in the inner circumferential surface of the first end 41d (the right end as viewed in FIG. 4) of the ball nut 41. The engaging portion 81b is engaged with the groove 83. Accordingly, even if fastening of the ball nut 41 acting on the driven pulley 32 is loosened, the ball nut 41 is restricted from moving leftward with respect to the driven pulley 32, or in a direction escaping the driven pulley 32.

The loosening prevention member 81 may also be provided between the driven gear 72 and the ball nut 41 in the second embodiment. The contact portion 81c is engaged with the right end face of the driven gear 72 in the axial direction of the loosening prevention member 81. A groove (not shown) is formed in the inner circumferential surface of the first end 41d of the ball nut 41, and the engaging portion 81b is engaged with the groove. This restricts the ball nut 41 from moving leftward with respect to the driven gear 72 as viewed in FIG. 3.

As loosening prevention means for the ball nut 41 with the driven pulley 32 or the driven gear 72, the following structure may be employed. That is, in the first embodiment, the first end 41d of the ball nut 41 (the right end as viewed in FIG. 2) may be extended to project from the right end face 82 of the assembled driven pulley 32, and loosening prevention member such as a snap ring may be attached to the projecting portion. In this manner, the ball nut 41 is restricted from moving in a direction escaping from the driven pulley 32 (leftward as viewed in FIG. 2). The same loosening prevention means may be applied to the ball nut 41 in the second embodiment with the driven gear 72.

Further, as loosening prevention means for the ball nut 41 with the driven pulley 32 or the driven gear 72, the following structure may be employed in the first and second embodiments. That is, thread-fastened parts of the driven pulley 32 or the driven gear 72 with the ball nut 41 may be swaged to restrict relative rotation. In this manner, the ball nut 41 is prevented from loosened with respect to the driven pulley 32 or the driven gear 72 without increasing the number of components. Also, the fastening torque applied to the driven pulley 32 or the driven gear 72 by the ball nut 41 may be lowered.

Therefore, the present examples and embodiments are to be considered as illustrative and not restrictive and the invention is not to be limited to the details given herein, but may be modified within the scope and equivalence of the appended claims.

The invention claimed is:

1. An electric power steering apparatus that uses rotational force of a motor to assist motion of a rack shaft, which moves linearly in accordance with a steering operation, the apparatus comprising:
   a power conversion mechanism that converts rotation of the motor to linear motion of the rack shaft; and
   a housing that accommodates the rack shaft and the power conversion mechanism, wherein:
   the power conversion mechanism includes a ball screw mechanism and a transmission mechanism,
   the ball screw mechanism includes a ball nut that is threaded to the rack shaft via a plurality of balls and is rotationally supported on an inner circumferential surface of the housing via a bearing,
   the transmission mechanism includes (i) a driving wheel that rotates as a drive of the motor, (ii) a driven wheel that is formed into a cylindrical shape, has an outer circumferential surface and an inner circumferential surface on which a female thread portion is formed, and is fitted about an outer circumferential surface of the ball nut to transmit rotation of the driving wheel to the ball nut, and (iii) a rotation transmitting member that is located on the outer circumferential surface of the driven wheel and that is capable of transmitting the rotation of the driving wheel to the driven wheel,
   the ball nut includes a first end in which is formed a male thread portion and that is inserted in and directly coupled to the driven wheel by fastening the male thread portion to the female thread portion of the driven wheel, and a second end where a flange is formed on the outer circumferential surface of the ball nut, an inner race of the bearing being pressed by the flange toward the driven wheel in the axial direction of the ball nut so as to be clamped between the driven wheel and the flange, and
   a virtual plane perpendicular to the axial direction of the ball nut intersects both the female thread portion of the driven wheel and the portion of the rotation transmitting member that is located on the outer circumferential surface of the driven wheel.

2. The electric power steering apparatus according to claim 1, wherein
   the ball screw mechanism includes a recirculating member that is fitted in the outer circumferential surface of the ball nut to recirculate the plurality of balls, and
   the male thread portion is formed at a part offset in the axial direction of the ball nut from the recirculating member.

3. An electric power steering apparatus that uses rotational force of a motor to assist motion of a rack shaft, which moves linearly in accordance with a steering operation, the apparatus comprising:
   a power conversion mechanism that converts rotation of the motor to linear motion of the rack shaft; and
   a housing that accommodates the rack shaft and the power conversion mechanism, wherein:
   the power conversion mechanism includes a ball screw mechanism and a transmission mechanism,
   the ball screw mechanism includes a ball nut that is threaded to the rack shaft via a plurality of balls and is rotationally supported on an inner circumferential surface of the housing via a bearing,
   the transmission mechanism includes (i) a driving wheel that rotates as a drive of the motor, (ii) a driven wheel that is formed into a cylindrical shape, has an outer circumferential surface and an inner circumferential surface on which a female thread portion is formed, and is fitted about an outer circumferential surface of the ball nut to transmit rotation of the driving wheel to the ball nut, and (iii) a rotation transmitting member that is located on the outer circumferential surface of the driven wheel and that is capable of transmitting the rotation of the driving wheel to the driven wheel,
   the ball nut includes a first end in which is formed a male thread portion and that is inserted in and directly coupled to the driven wheel by fastening the male thread portion to the female thread portion of the driven wheel, and a second end where a flange is formed on the outer circumferential surface of the ball nut, an inner race of the bearing being pressed by the flange toward the driven wheel in the axial direction of the ball nut so as to be clamped between the driven wheel and the flange, and
   in a direction perpendicular to the axial direction of the ball nut, the driven wheel fills the entire space between the female thread portion of the driven wheel and the portion of the rotation transmitting member located on the outer circumferential surface of the driven wheel.

* * * * *